US008867462B2

(12) United States Patent
Lee et al.

(10) Patent No.: US 8,867,462 B2
(45) Date of Patent: Oct. 21, 2014

(54) METHOD AND APPARATUS FOR TRANSMITTING TRAINING SEQUENCE IN MULTI USER WIRELESS COMMUNICATION SYSTEM

(75) Inventors: Yu-Ro Lee, Daejeon (KR); Sok-Kyu Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 266 days.

(21) Appl. No.: 13/035,105

(22) Filed: Feb. 25, 2011

(65) Prior Publication Data

US 2011/0255488 A1 Oct. 20, 2011

(30) Foreign Application Priority Data

Feb. 25, 2010 (KR) .................. 10-2010-0017418

(51) Int. Cl.
*H04W 4/00* (2009.01)
*H04L 25/02* (2006.01)
*H04L 5/00* (2006.01)
*H04W 24/00* (2009.01)
*H04W 28/06* (2009.01)

(52) U.S. Cl.
CPC .......... *H04L 5/0048* (2013.01); *H04L 25/0226* (2013.01); *H04L 5/0023* (2013.01); *H04W 24/00* (2013.01); *H04W 28/06* (2013.01); *H04L 25/0228* (2013.01)
USPC ........... 370/329; 370/351; 370/352; 370/252; 370/338; 375/292; 375/299; 375/267

(58) Field of Classification Search
USPC .......... 370/351, 352, 329, 252, 338; 375/292, 375/299, 267
See application file for complete search history.

(56) References Cited

U.S. PATENT DOCUMENTS

| | | | |
|---|---|---|---|
| 8,170,160 B1 * | 5/2012 | Shi ................................ | 375/347 |
| 8,218,690 B1 * | 7/2012 | Zhang ........................... | 375/340 |
| 2001/0033578 A1 * | 10/2001 | Ortega Rodriguez et al. ............................. | 370/442 |
| 2005/0276347 A1 * | 12/2005 | Mujtaba et al. ............... | 375/299 |
| 2006/0182017 A1 | 8/2006 | Hansen et al. | |
| 2007/0053452 A1 * | 3/2007 | Koo et al. ...................... | 375/260 |
| 2007/0189412 A1 * | 8/2007 | Xia et al. ....................... | 375/292 |
| 2007/0270173 A1 * | 11/2007 | Niu et al. ....................... | 455/522 |
| 2009/0122882 A1 * | 5/2009 | Mujtaba ........................ | 375/260 |
| 2009/0175234 A1 * | 7/2009 | Dasgupta et al. ............. | 370/329 |
| 2010/0111220 A1 * | 5/2010 | Rouquette-Leveil et al. | 375/295 |
| 2011/0013532 A1 * | 1/2011 | Wu et al. ....................... | 370/252 |
| 2011/0096797 A1 * | 4/2011 | Zhang et al. .................. | 370/474 |
| 2011/0128893 A1 * | 6/2011 | Park et al. ..................... | 370/279 |
| 2011/0182261 A1 * | 7/2011 | Tanaka .......................... | 370/329 |
| 2011/0188482 A1 * | 8/2011 | Vermani et al. ............... | 370/338 |

* cited by examiner

*Primary Examiner* — Khaled Kassim

(57) ABSTRACT

An apparatus of transmitting a long training field includes: a station number determination unit configured to determine at least one station to be transmitted using transmission data or channel status information; a transmission stream allocation unit configured to determine the number of transmission streams for each of the least one station determined by the station number determination unit; a long training field number calculation unit configured to calculate the number of long training fields required for each of the at least one station determined by the transmission stream allocation unit and determines the least common multiple of the number of calculated long training fields of each station; and a long training field allocation unit configured to allocate the long training fields for each station to subcarriers allocated to each station to correspond to the least common multiple of the determined long training fields.

17 Claims, 11 Drawing Sheets

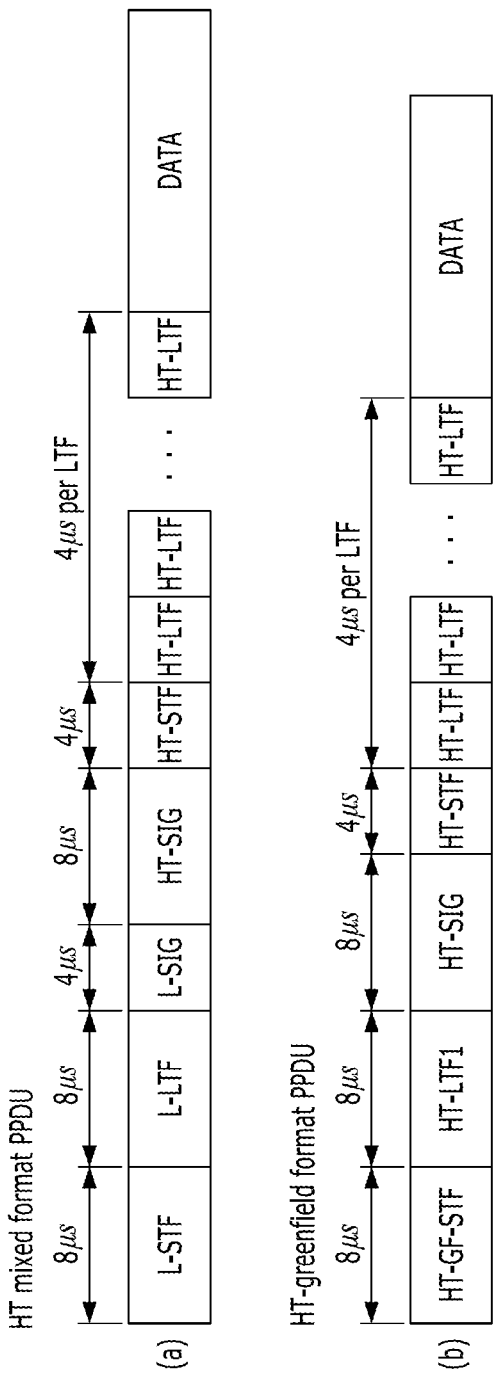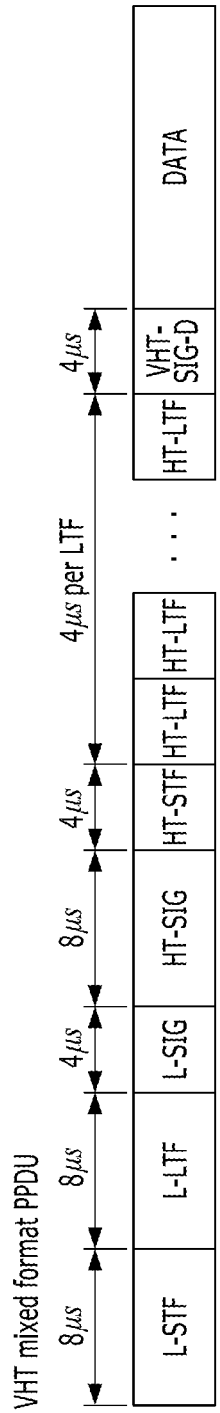

METHOD AND APPARATUS FOR TRANSMITTING TRAINING SEQUENCE IN MULTI USER WIRELESS COMMUNICATION SYSTEM

CROSS-REFERENCE TO RELATED APPLICATIONS

The present application claims priority of Korean Patent Application No. 10-2010-0017418 filed on Feb. 25, 2010, which is incorporated herein by reference in its entirety.

BACKGROUND OF THE INVENTION

1. Field of the Invention

Exemplary embodiments of the present invention relate to a technology of transmitting a long training field in a radio communication system, and more particularly, to a method and an apparatus of efficiently transmitting a long training field (LTF) in accordance with the number of streams allocated to each user in a multi-user multiple input multiple output (MIMO) based radio communication system.

2. Description of Related Art

Various transmission technologies capable of providing a high transmission rate have been currently researched in a radio communication field. IEEE 802.11 test group n (TGn) is organized in order for a wireless LAN system to provide a high transmission rate. IEEE 802.11 TGn standardizes a wireless LAN system having a maximum transmission rate of 600 Mbps to which a multiple input multiple output (MIMO) technology is applied.

FIG. 1 illustrates two protocol data units that are defined in the IEEE 802.11 TGn. An (a) in FIG. 1 illustrates a physical layer convergence procedure (PLCP) protocol data unit (PPDU) in a high throughput (HT) mixed format in which a legacy station and an HT station are mixed, and (b) in FIG. 1 illustrates the PLCP protocol data unit (PPDU) in an HT Greenfield format in which only the HT station is present.

Referring to FIG. 1, the PPDU in the format in which the legacy station and the HT station are mixed includes training symbol fields (L-STF and L-LTF) and a signal field (L-SIG) for the legacy station and a signal field (HT-SIG), training symbol fields (HT-STF and HT-LTF), and a data field (Data) for the HT station.

Further, referring to FIG. 1, the PPDU under the Greenfield in which only the HT station is present includes a short training symbol (HT-GE-STF) and a long training symbol (HT-LTF1), an HT signal field (HT-SIG), HT long training symbols (HT-FLT) for the HT Greenfield, a data field (Data) for the HT Greenfield.

Further, in the IEEE 802.11 TGn, a single station (STA) is defined to transmit a maximum of four streams. Each stream transmits the LTF symbols using a long training field (LTF) mapping code depending on Equation 1. When a spatial stream is smaller than four, a sub-matrix of the LTF mapping code depending on Equation 1 is used.

$$P_{HTLTF} = \begin{bmatrix} 1 & -1 & 1 & 1 \\ 1 & 1 & -1 & 1 \\ 1 & 1 & 1 & -1 \\ -1 & 1 & 1 & 1 \end{bmatrix} \begin{matrix} \text{Spatial} \\ \text{Stream} \end{matrix} \quad \text{[Equation 1]}$$

For example, when a transmitting antenna and a receiving antenna, respectively, are two and a transmitting stream is two, if it is assumed that an MIMO channel to be estimated is expressed by Equation 2, the received signal to which the LFT mapping code is applied is expressed by the following Equation 3.

$$H = \begin{bmatrix} h_{00} & h_{01} \\ h_{10} & h_{11} \end{bmatrix} \quad \text{[Equation 2]}$$

$$y = \begin{bmatrix} h_{00} & h_{01} \\ h_{10} & h_{11} \end{bmatrix} \frac{p}{\sqrt{2}} \begin{bmatrix} 1 & -1 \\ 1 & 1 \end{bmatrix} + \begin{bmatrix} n_{00} & n_{01} \\ n_{10} & n_{11} \end{bmatrix} = \quad \text{[Equation 3]}$$

$$\frac{1}{\sqrt{2}} \begin{bmatrix} h_{00}+h_{01} & -h_{00}+h_{01} \\ h_{10}+h_{11} & -h_{10}+h_{11} \end{bmatrix} + \begin{bmatrix} n_{00} & n_{01} \\ n_{10} & n_{11} \end{bmatrix}$$

In this case, a subcarrier index is omitted in the received signals for convenience and thus, the LTF field p also has different values in accordance with the subcarrier. Therefore, the estimated channel is expressed by the following Equation 4. In the following Equation 4, n represents noise.

$$\hat{H} = \frac{p}{\sqrt{2}} \begin{bmatrix} h_{00}+h_{01} & -h_{00}+h_{01} \\ h_{10}+h_{11} & -h_{10}+h_{11} \end{bmatrix} \quad \text{[Equation 4]}$$

$$\frac{p^*}{\sqrt{2}} \begin{bmatrix} 1 & 1 \\ -1 & 1 \end{bmatrix} + \begin{bmatrix} n_{00} & n_{01} \\ n_{10} & n_{11} \end{bmatrix} \frac{p^*}{\sqrt{2}} \begin{bmatrix} 1 & 1 \\ -1 & 1 \end{bmatrix} =$$

$$|p|^2 \begin{bmatrix} h_{00} & h_{01} \\ h_{10} & h_{11} \end{bmatrix} + \frac{p^*}{\sqrt{2}} \begin{bmatrix} n_{00}-n_{01} & n_{00}+n_{01} \\ n_{10}-n_{11} & n_{10}+n_{11} \end{bmatrix}$$

An LTF mapping code $P_{HTLTF}$ for the HT station has unitary characteristic. Therefore, the number ($N_{DLTF}$) of LTFs depending on the number ($N_{STS}$) of spatial streams is as shown in the following Table 1.

TABLE 1

| $N_{STS}$ | $N_{DLTF}$ |
|---|---|
| 1 | 1 |
| 2 | 2 |
| 3 | 4 |
| 4 | 4 |

In Table 1, the STS represent a spatial time stream. It is assumed in the exemplary embodiment of the present invention that the number of spatial streams is equal to the number of spatial time streams. Further, the DLTF represents a data long training field. It is assumed in the exemplary embodiment of the present invention that the number of data long training fields is equal to the number of long training fields.

Recently, IEEE 802.11 VHT Study Group (SG) is discussing a wireless LAN system capable of providing a transmission rate of a maximum of 1 Gbps in a MAC service access point (SAP) and configures a Task Group of IEEE 802.11

TGac/TGad. In order to maintain frequency efficiency while meeting the high transmission rate, an access point (AP) and a station (STA) need to support streams more than four streams supported in the Task Group n (TGn), such that a large number of antennas are required.

In an aspect of the station (STA), it is difficult to support a large number of antennas when considering complexity or power consumption of the station. Therefore, a multi-user MIMO technology for allowing the access point AP to simultaneously transmit data to the plurality of stations (STAs) has been considered. When the same type as the Task Group n (TGn) is expanded to a multi-user MIMO type so as to transmit at least four streams, a need exists for a new format capable of support at least four streams. A very high throughput (VHT) wireless LAN system uses the multi-user MIMO technology to consider the PLCP protocol data unit (PPDU) format as illustrated in FIG. 2.

FIG. 2 illustrates the PLCP protocol data unit (PPDU) format in a VHT mixed format in which the legacy station, the HT station, and the VHT stations are mixed.

Referring to FIG. 2, the PLCP protocol data unit (PPDU) for the VHT includes the training symbol fields (L-STF and L-LTF) for the legacy station, the signal field (L-SIG) for the legacy station, a signal field (VHT-SIG-C) for the VHT station that can be decoded by all the stations, the training symbol fields (VHT-STF and VHT-LFT) for the VHT station, the signal field for the VHT station (VHT-SIG-D that can be decoded by only the VHT station, and the data field (Data).

If it is assumed that four stations (STAs) each transmit two streams, 8 LTF symbols are required so as to perform the channel estimation without interference between the stations (STAs). When the total number of transmission streams is 8, the LTF mapping code depending on Equation 5 may be created by expanding the mapping code of the Task Group n (TGn). When the number of spatial streams is smaller than 8, the sub-matrix of the LTF mapping code is used.

$$P_{VHTLTF} = \begin{bmatrix} 1 & -1 & 1 & 1 & 1 & -1 & 1 & 1 \\ 1 & 1 & -1 & 1 & 1 & 1 & -1 & 1 \\ 1 & 1 & 1 & -1 & 1 & 1 & 1 & -1 \\ -1 & 1 & 1 & 1 & -1 & 1 & 1 & 1 \\ 1 & -1 & 1 & 1 & -1 & 1 & -1 & -1 \\ 1 & 1 & -1 & 1 & -1 & -1 & 1 & -1 \\ 1 & 1 & 1 & -1 & -1 & -1 & -1 & 1 \\ -1 & 1 & 1 & 1 & 1 & -1 & -1 & -1 \end{bmatrix} \quad \text{[Equation 5]}$$

When considering that the LTF mapping code $P_{VHTLTF}$ for the VHT station has the unitary characteristic, the relationship between the number of streams and the number of LFTs in the LTF mapping code is as shown in Table 2. Table 2 shows the relationship between the number ($N_{STS}$) of spatial streams and the number ($N_{DLTF}$) of LTFs when the LTF mapping code of the TGn for the VHT is expanded.

TABLE 2

| $N_{STS}$ | $N_{DLTF}$ |
|---|---|
| 1 | 1 |
| 2 | 2 |
| 3 | 4 |
| 4 | 4 |
| 5 | 8 |
| 6 | 8 |

TABLE 2-continued

| $N_{STS}$ | $N_{DLTF}$ |
|---|---|
| 7 | 8 |
| 8 | 8 |

As can be appreciated from Table 2, 8 LTFs are required even when 5, 6, and 7 streams are transmitted. Therefore, using the expanded mapping code of the Task Group n (TGn) increases the overhead of the LTF.

Meanwhile, as another mapping code, a type such as discrete Fourier transform (DFT) may be applied. In this case, the relationship between the total number of transmission streams and the number of LTFs is as shown the following Table 3. Table 3 shows the relationship between the number of spatial streams and the number of LTFs when an orthogonal mapping code such as the DFT for the VHT is applied.

TABLE 3

| $N_{STS}$ | $N_{DLTF}$ |
|---|---|
| 1 | 1 |
| 2 | 2 |
| 3 | 3 |
| 4 | 4 |
| 5 | 5 |
| 6 | 6 |
| 7 | 7 |
| 8 | 8 |

As can be appreciated from Table 3, 8 LTFs are required to transmit eight streams. Increasing the number of LTFs increases a weight occupied by the LTF in the PLCP protocol data unit (PPDU) format, such that there is a problem in that the transmission efficiency is degraded.

For example, when considering the MU-MIMO environment in which two stations (STA) each transmit four streams of a packet of 1500 bytes simultaneously, the access point (AP) may transmit a total of eight streams. Comparison of the transmission efficiency in this case and the transmission efficiency of the case of the TGn transmitting four streams is as shown in Table 4.

TABLE 4

| | The number of LTFs (STF, LTF, SIG) | The number of Data symbols (40 MHz bandwidth, 600 Mbps/STA) | Transmission Efficiency (%) The number of data symbols/Total number of symbols of PPDU format |
|---|---|---|---|
| TGn | 4 | 6 | 33% |
| VHT | 8 | 6 | 26% |

That is, when the LTF mapping type as shown in [Table 2] and [Table 3] is applied, it can be appreciated that the data transmission efficiency may greatly degraded in the VHT wireless LAN system. When the number of user stations (STAs) performing simultaneous transmission in the VHT wireless LAN system is more increased, the number of LTFs is more increased. In this case, the transmission efficiency may be more reduced than that of the TGn wireless LAN system.

SUMMARY OF THE INVENTION

An embodiment of the present invention is directed to a method and an apparatus of transmitting a long training field capable of increasing transmission efficiency of a system by efficiently mapping a long training field (LTF) depending on the number of streams to be transmitted to reduce overhead of the long training field (LTF) occupied in a transmission frame in a multi-user multiple input multiple output (MU-MIMO) based on radio communication system transmitting a plurality of streams to each user station.

Another embodiment of the present invention is directed to a method and an apparatus of transmitting a long training field capable of improving channel estimation performance of a station (STA) having a poor channel status through recombination of a long training field at the time of mapping the long training field depending on the number of streams allocated to each station.

In accordance with an embodiment of the present invention, a method of transmitting a long training field for transmitting in a multi-user multiple input multiple output based radio communication system includes: (a) determining at least one station transmitting data and the number of transmission streams for the at least one station; (b) calculating the number of long training fields for each station corresponding to the number of determined transmission streams and determining the least common multiple of the number of long training fields; and (c) allocating the long training fields for each station to correspond to the number of symbols of the determined least common multiple.

In accordance with another embodiment of the present invention, a method of transmitting a long training field in a multi-user multiple input multiple output based radio communication system includes: (a) determining at least station transmitting data and the number of transmission stream for the stations; recombining and remapping transmission streams for each station if it is determined that the remapping of the long training fields is needed through channel status information of each station; (b) calculating the number of long training fields corresponding to the number of remapped transmission streams and determining the least common multiple of the number of long training fields; and (c) allocating the long training fields for each station to correspond to the number of symbols of the determined least common number.

In accordance with another embodiment of the present invention, an apparatus of transmitting a long training field in a multi-user multiple input multiple output based radio communication system includes: a station number determination unit that is configured to determine at least one station to be transmitted using transmission data or channel status information; a transmission stream allocation unit that is configured to determine the number of transmission streams for each of the least one stations determined by the station number determination unit; a long training field number calculation unit that is configured to calculate the number of long training fields required for each of the at least one station determined by the transmission stream allocation unit and determines the least common multiple of the number of calculated long training fields of each station; and a long training field allocation unit that is configured to allocate the long training fields for each station to subcarriers allocated to each station to correspond to the least common multiple of the determined long training fields.

The transmission stream allocation unit may combine and remap transmission streams for each station if it is determined that the remapping of the long training fields is needed through channel status information of the at least one determined station and the long training field number calculation unit may calculate the number of remapped long training fields corresponding to the number of remapped transmission streams.

The long training field allocation unit may repeatedly allocate the long training fields to subcarriers allocated to each station until the number of long training fields for each station is the symbols of the least common multiple if the number of long training fields for each station is smaller than the determined least common multiple.

The long training field allocation unit may repeatedly allocate the long training fields to the subcarriers when the repetition of the long training fields allocated to the subcarriers is needed so as to improve channel estimation performance.

The station number determination unit may determine the at least one station to be transmitted and a transmission weight using transmission data and channel status information.

The long training field allocation unit may calculate the number of long training fields for each station using the transmission streams for each station and a long training field mapping code.

The long training field allocation unit may allocate the long training fields for each station by allocating a weight to the long training field mapping code so as to improve channel estimation performance.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

BRIEF DESCRIPTION OF THE DRAWINGS

FIG. 1 is diagrams illustrating a PPDU format in IEEE 802.11 Task Group n (TGn).

FIG. 2 is a diagram illustrating the PPDU format in the VHT mixed format in IEEE 802.11 Task Group ac (TGac).

DESCRIPTION OF SPECIFIC EMBODIMENTS

Figure 3:
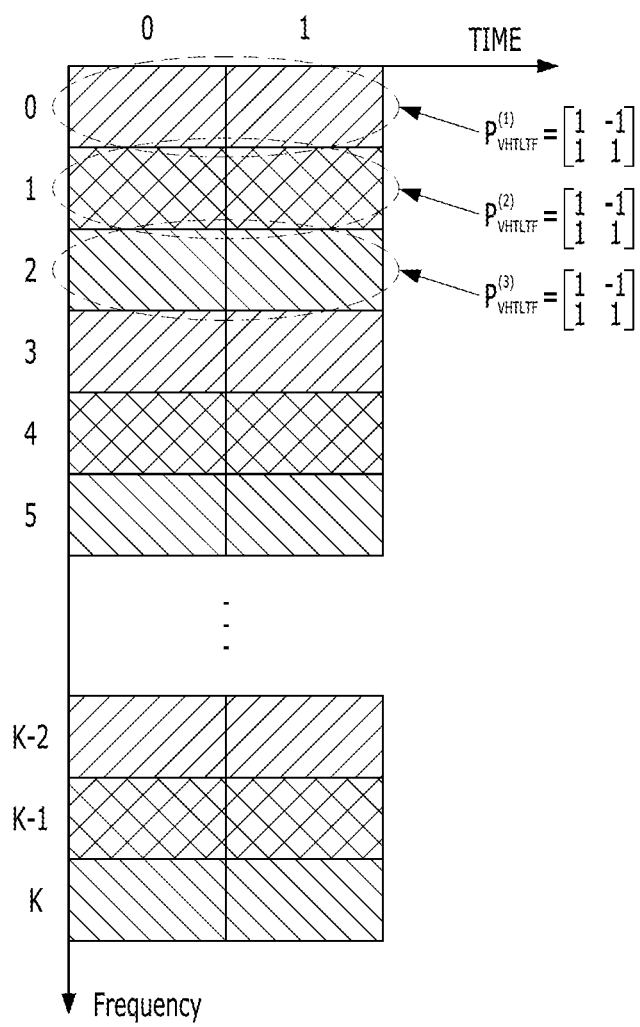
FIG. 3 is a diagram illustrating a long training field (LTF) allocation status when the number of stations to be transmitted is 3 and the number of streams for each station is 2, in accordance with an exemplary embodiment of the present invention.

The above objects, features, and advantages will be described in detail with reference to the accompanying drawings and therefore, the technical ideas of the present invention can be easily practiced by a person with ordinary skill in the art to which the present invention pertains. Further, when it is determined that the detailed description of the known art related to the present invention may obscure the gist of the present invention, the detailed description thereof will be omitted. Hereinafter, exemplary embodiments of the present invention will be described in detail with reference to the accompanying drawings. Throughout the disclosure, like reference numerals refer to like parts throughout the various figures and embodiments of the present invention.

Exemplary embodiments of the present invention will describe, by way of example, a VHT wireless LAN system of IEEE 802.11 TGac. However, this is only one example for explaining a principle of the present invention and the scope of the present invention is not limited thereto.

In a multi-user MIMO based radio communication system, an exemplary embodiment of the present invention uses the method of transmitting long training field (LTF) to be described below so as to improve transmission efficiency by reducing LTF overhead or improving channel estimation performance. The exemplary embodiments of the present invention to be described below may use an LTF mapping code of Equation 5 and may use another LTF mapping code such as a DFT mapping code.

The method of allocating long training field symbols for each station (STAs) in accordance with a first exemplary embodiment of the present invention determines a required LTF symbol in accordance with the number of streams to be transmitted by each station, periodically maps an LTF transmission signal from each station (STAs) to subcarriers, and determines the number of LTFs required for transmission as the least common multiple of the number of LTFs required for each station.

For example, it is assumed that STA allocated to k mod $N_{STA}=0$ is STA1, STA allocated to k mod $N_{STA}=1$ is STA 2, STA allocated to k mod $N_{STA}=(N_{STA}-1)$ is STA $N_{STA}$. Herein, k is a subcarrier number configured of K+1 number. Generally, the number of subcarriers is 52 in 20M band, the number of subcarriers is 114 in 40M band, and the number of subcarriers is 242 in 80M band. The streams to be transmitted by each station (STAs) are represented by {the number of streams of STA 1, the number of streams of STA 2, ..., the number of streams of STA $N_{STA}$} in order.

When $N_{STA}=3$, i.e., the number of stations to be transmitted is 3 and the case in which the number of streams to be transmitted by each station is 2 is {2, 2, 2}, the number of LTFs required for each station is {2, 2, 2} as shown in Table 2. Therefore, the least common multiple of the number of LTFs required for transmission is 2 and as illustrated in FIG. 3, the LTF of two symbols is allocated to each subcarrier.

FIG. 3 is a diagram illustrating the long training field (LTF) allocation status when the number of stations to be transmitted is 3 and the number of streams to be transmitted by each station is 2, in accordance with an exemplary embodiment of the present invention. In FIG. 3, $P_{VHTLTF}^{(u)}$ represents the LTF mapping code for a u-th station. Since $N_{STA}=3$, the subcarriers are allocated to each station based on the subcarrier index that is a multiple of 3.

Figure 4:
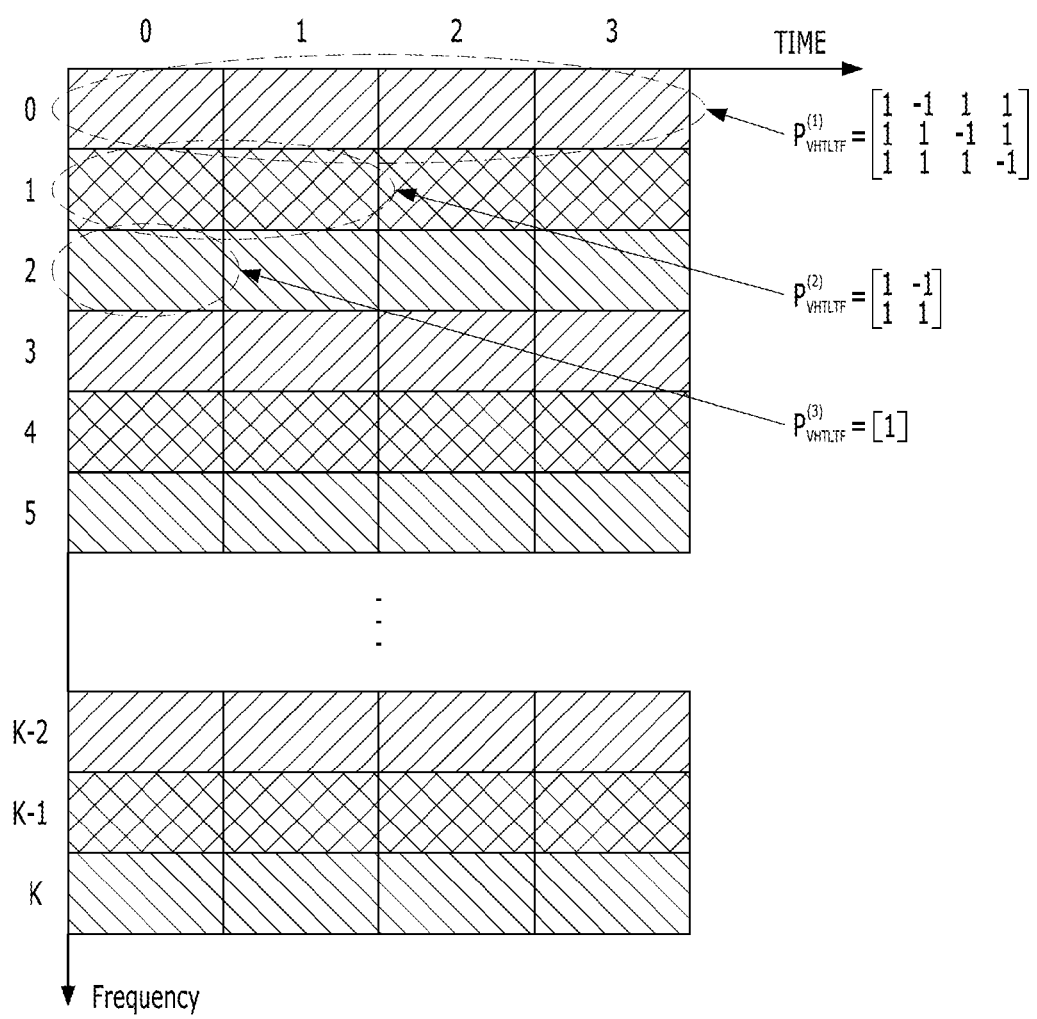
FIG. 4 is a diagram illustrating the long training field (LTF) allocation status when the number of stations to be transmitted is 3 and the number of streams for each station is {3, 2, 1}, in accordance with the exemplary embodiment of the present invention.

FIG. 4 is a diagram for explaining the method of allocating LTF symbols when $N_{STA}=3$, i.e., the number of stations to be transmitted is 3 and the number of streams to be transmitted by each station is {3, 2, 1}. Since the number of streams to be transmitted by each station is {3, 2, 1}, the number of LTFs required for each station is {4, 2, 1} as shown in Table 2. Therefore, the least common multiple of the LTFs required for transmission is 4.

Referring to FIG. 4, since the LTF required for the station (STA) 2 is two symbols, the LTF mapping code of 0 and 1 is repeatedly allocated in time index 2 and 3. Further, since the LTF required for the station (STA) 3 is one symbol, the LTF mapping code of 0 is repeatedly allocated in time index 1, 2, 3.

Figure 5:
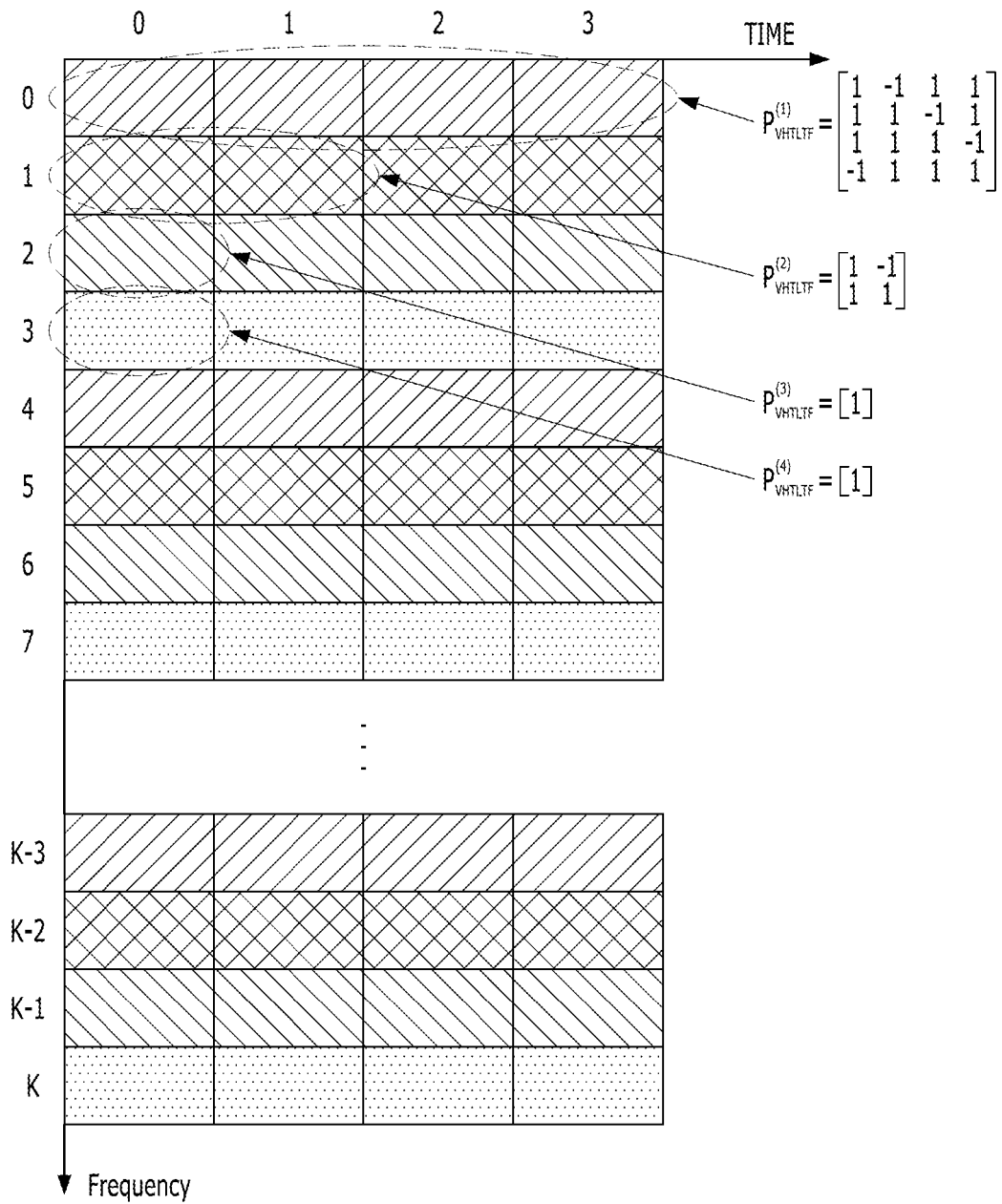
FIG. 5 is a diagram illustrating the long training field (LTF) allocation status when the number of stations to be transmitted is 4 and the number of streams for each station is {4, 2, 1, 1}, in accordance with the exemplary embodiment of the present invention.

FIG. 5 is a diagram for explaining a method of allocating LTF symbols when $N_{STA}=4$, i.e., the number of stations to be transmitted is 4 and the number of streams to be transmitted by each station is {4, 2, 1, 1}. Since the number of streams to be transmitted by each station (STAs) is {4, 2, 1, 1}, the number of LTFs required for each station is {4, 2, 1, 1} as shown in Table 2. Therefore, as illustrated in FIG. 5, the least common multiple of the LFT required for transmission is 4.

Referring to FIG. 5, since the LTF required for the station (STA) 2 is two symbols, the LTF mapping code of time index 0 and 1 is repeatedly allocated in time index 2 and 3. Further, since the LTF required for the station (STA) 3 is one symbol, the LTF mapping code of time index 0 is repeatedly allocated in time index 1, 2, 3. Further, since the LTF required for the station (STA) 4 is one symbol, the LTF mapping code of time index 0 is repeatedly allocated in time index 1, 2, 3.

As described above, in accordance with the first exemplary embodiment of the present invention, if it is assumed that $N_{STA}=K$ and the number of streams to be transmitted by each station (STAs) is $\{a_1, a_2, \ldots, a_K\}$, the number of LTFs required for each station (STAs) is $\{b_1, b_2, \ldots, b_K\}$. Therefore, the number of LTFs required for transmission becomes the least common multiple of $\{b1, b2, \ldots bK\}$. The number of LTFs required for transmission for each stream may be changed depending on a method of configuring the $P_{VHTLTF}$ that is the mapping code.

The exemplary embodiment of the present invention may increase the number of LTFs required for transmission by integer multiple.

Figure 6:
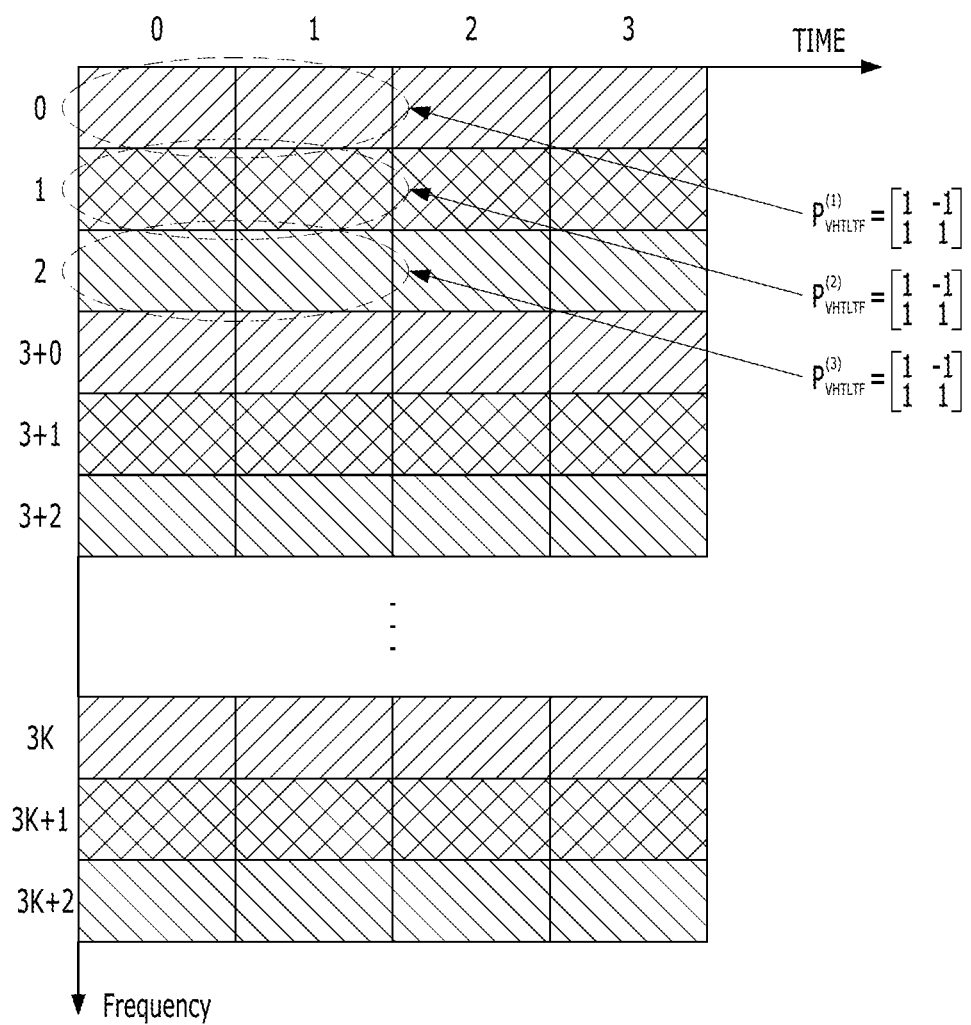
FIG. 6 is a diagram illustrating in a state in which the number of long training field (LTF) is increased two times when the number of stations to be transmitted is 3 and the number of streams for each station is 2, in accordance with an exemplary embodiment of the present invention.

FIG. 6 illustrates the case in which the number of required LTFs is two symbols when $N_{STA}=3$ and each stations (STAs) transmits two transmission streams, but illustrates the format in which the LTF symbols are repeated two times so as to improve the channel estimation performance. The repetition may be performed two times or more.

Figure 7:
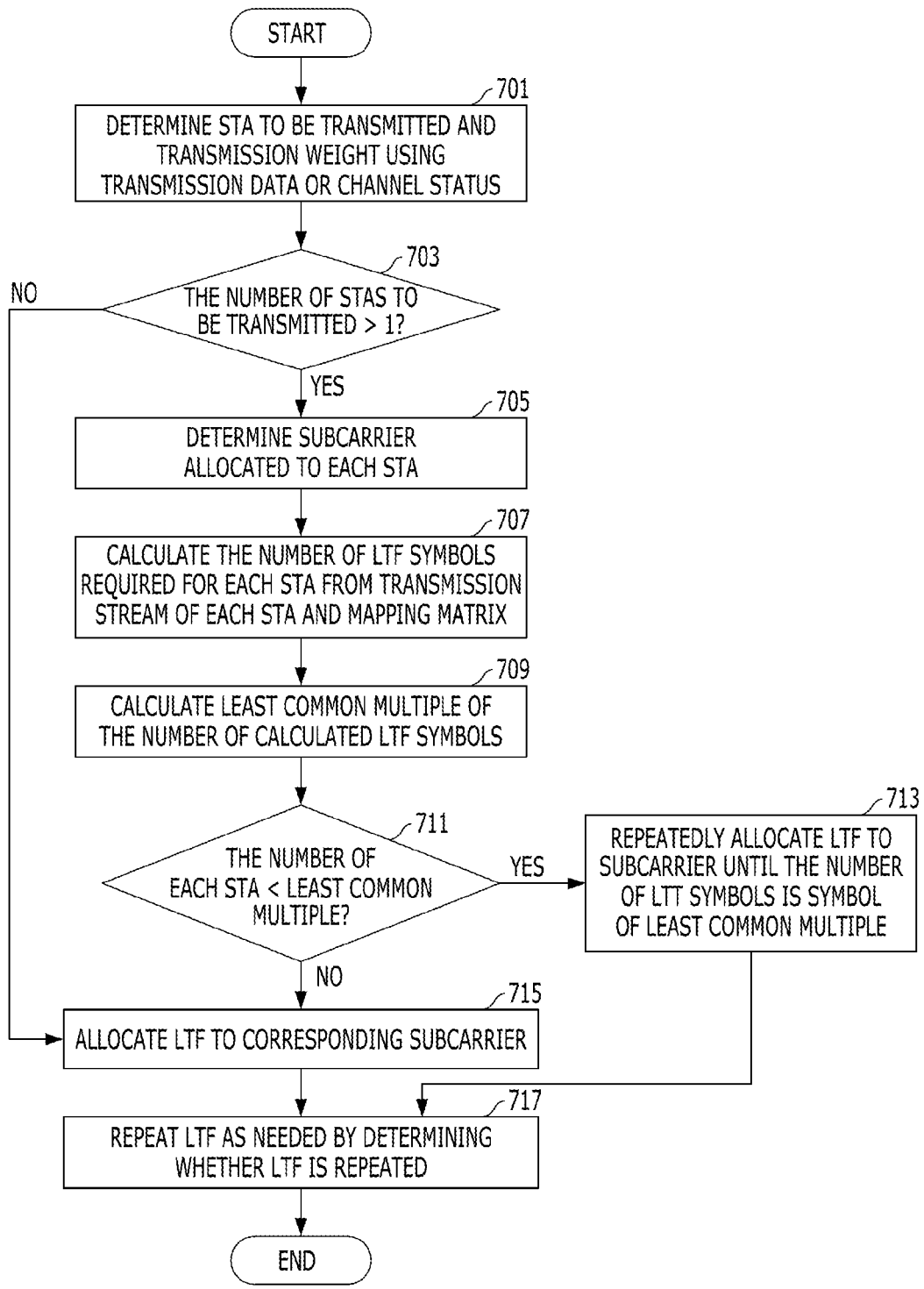
FIG. 7 is a flow chart for explaining a method of allocating long training field (LTF) depending on the number of streams allocated to each station (STAs) in accordance with a first exemplary embodiment of the present invention.

FIG. 7 is a flow chart for explaining a method of allocating LTFs depending on the number of transmission streams allocated to each station in accordance with the first exemplary embodiment of the present invention.

First, the stations (STAs) to be transmitted are determined and a transmission weight is determined (701), using information such as a transmission data size, quality of service (QoS), channel status, or the like. When the number of stations (STA) to be transmitted is 1 (703), a single station allocates the long training field (LTF) symbols to the subcarriers corresponding to the number of maximally available streams (715). Meanwhile, when the number of stations to be transmitted is equal to or larger than 2 (703), the subcarriers corresponding to the number of streams to be transmitted by each station are determined from the number of stations (STAs) to be transmitted (705).

Further, the number of LTF symbols required for each station is calculated from the streams to be transmitted by the each station and a mapping matrix (707). Thereafter, the least common multiple of the number of calculated LTF symbols required for each station is calculated (709). It confirms whether the number of LTF symbols required for the stations is smaller than the least common multiple (711). If it is determined that the number of LTF symbols required for the station is smaller than the least common multiple, the LTF symbols allocated to the previous time index are repeatedly allocated until the number of LTF symbols required for the stations becomes the symbol index of the least common multiple (713). However, when the number of LTF symbols required for the station is equal to the least common multiple (711), the LTF symbols corresponding to the least common multiple are allocated to the subcarriers corresponding to the number of streams to be transmitted by the stations (715). As described above, after the required LTF symbols are allocated to each station, the LTF symbols are repeated as needed when the repetition of the LTF symbols is needed so as to improve the channel estimation performance (717).

As described above, the exemplary embodiment of the present invention can demodulate the received signal if the number of simultaneously transmitted stations and the number of streams for each station is known at a receiving end. In the MU-MIMO based radio communication system, the number of simultaneously transmitted stations and the number of streams to be transmitted by each station may be transmitted using control information, or the like, during a process of connecting the VHT-SIG-C or the initial access point (AP) to the stations (STAs) in FIG. 2.

Next, a method of transmitting a long training field in accordance with a second exemplary embodiment of the present invention using the recombination of transmission streams will be described.

Figure 8:
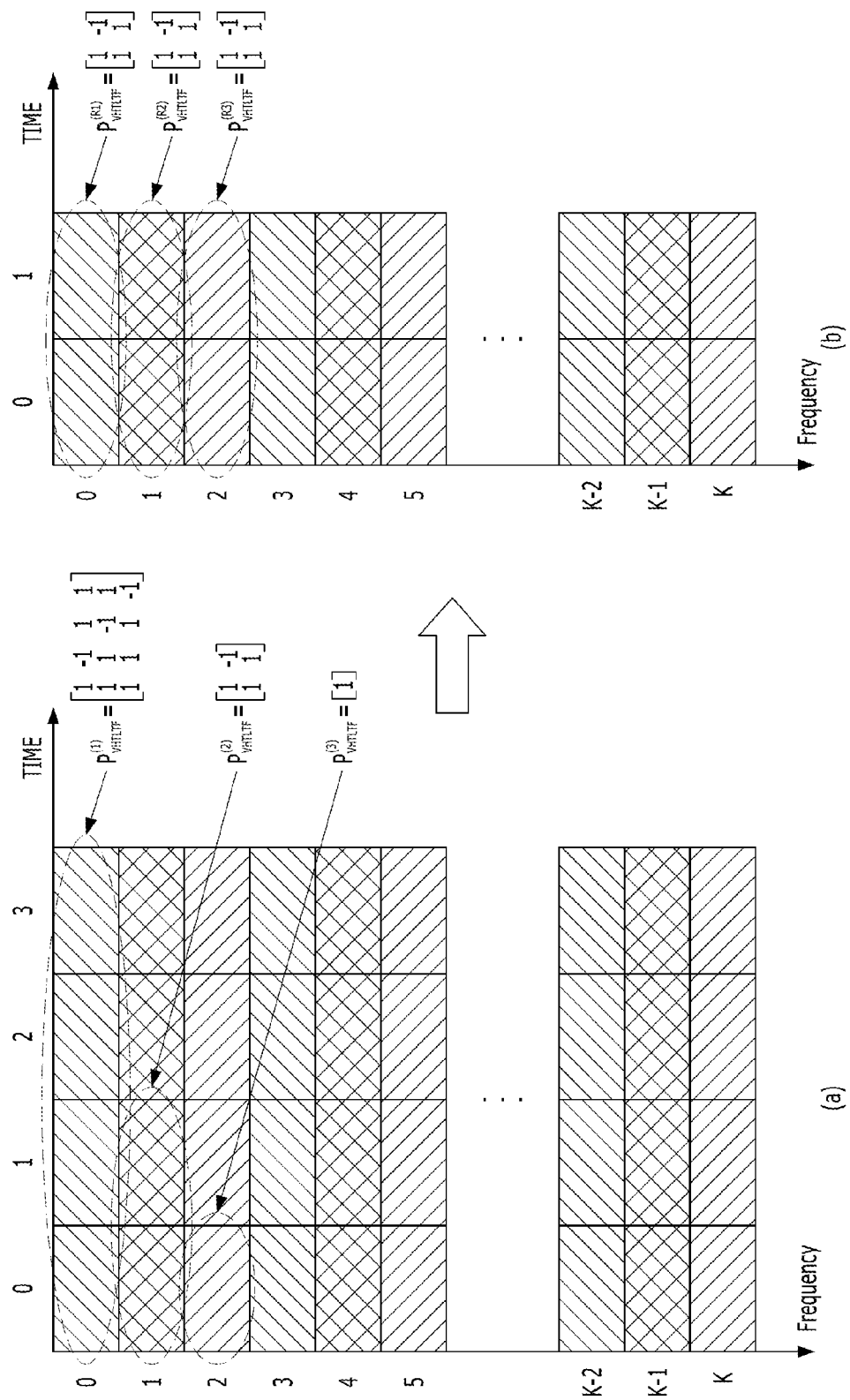
FIG. 8 is diagrams illustrating the long training field (LTF) allocation status using a recombination of streams when the number of stations to be transmitted is 3 and the number of streams for each station is {3, 2, 1}, in accordance with the exemplary embodiment of the present invention.

FIG. 8 is diagrams illustrating the long training field (LTF) allocation status using the recombination of streams when the number of stations to be transmitted is 3 and the number of streams to be transmitted by each station is {3, 2, 1}, in accordance with the exemplary embodiment of the present invention.

It is assumed that the number ($N_{STA}$) of stations to be transmitted is 3 and the number of streams to be transmitted by each station is {3, 2, 1}. In this case, the number of LTFs required for each station is {4, 2, 1}. Therefore, the least common multiple of the LTFs required for transmission is 4. In connection with this, as illustrated in FIG. 8, the second exemplary embodiment of the present invention may recombine a total of 6 transmissions streams as {2, 2, 2} for each station and then, the number of required LTFs is {2, 2, 2}, such that the least common multiple of the LTFs required for transmission is 2.

If it is assumed that a transmitting end knows the channel status, the channel estimation performance may be improved by the recombination of streams in consideration of the channel status. For example, if it is assumed that the transmission streams are transmitted by three stations and the number of streams to be transmitted by each station is {3, 1, 2} at a position of the stations, the number of LTFs required for each station is {4, 1, 2}, such that the least common multiple of the required LTFs is 4. In this case, if it is assumed that the station (STA) 1 and the station (STA) 2 have an excellent channel status but the station (STA) 3 has a poor channel status, each station has the following performance.

Since the station (STA) 1 has the excellent channel status, it may receive signals well. The station (STA) 2 has the excellent channel status and repeats the LTF four times as compared to the station (STA) 1, such that the channel estimation performance is excellent more than necessary. The station (STA) 3 has the poor channel status and repeats the LTF two times as compared to the station (STA) 1 and repeats the LTF at a smaller frequency than the station (STA) 2, such that the channel estimation performance is degraded. In this case, the stream recombination method between the stations is applied so as to improve the channel estimation performance of the station (STA) 3.

Figure 9:
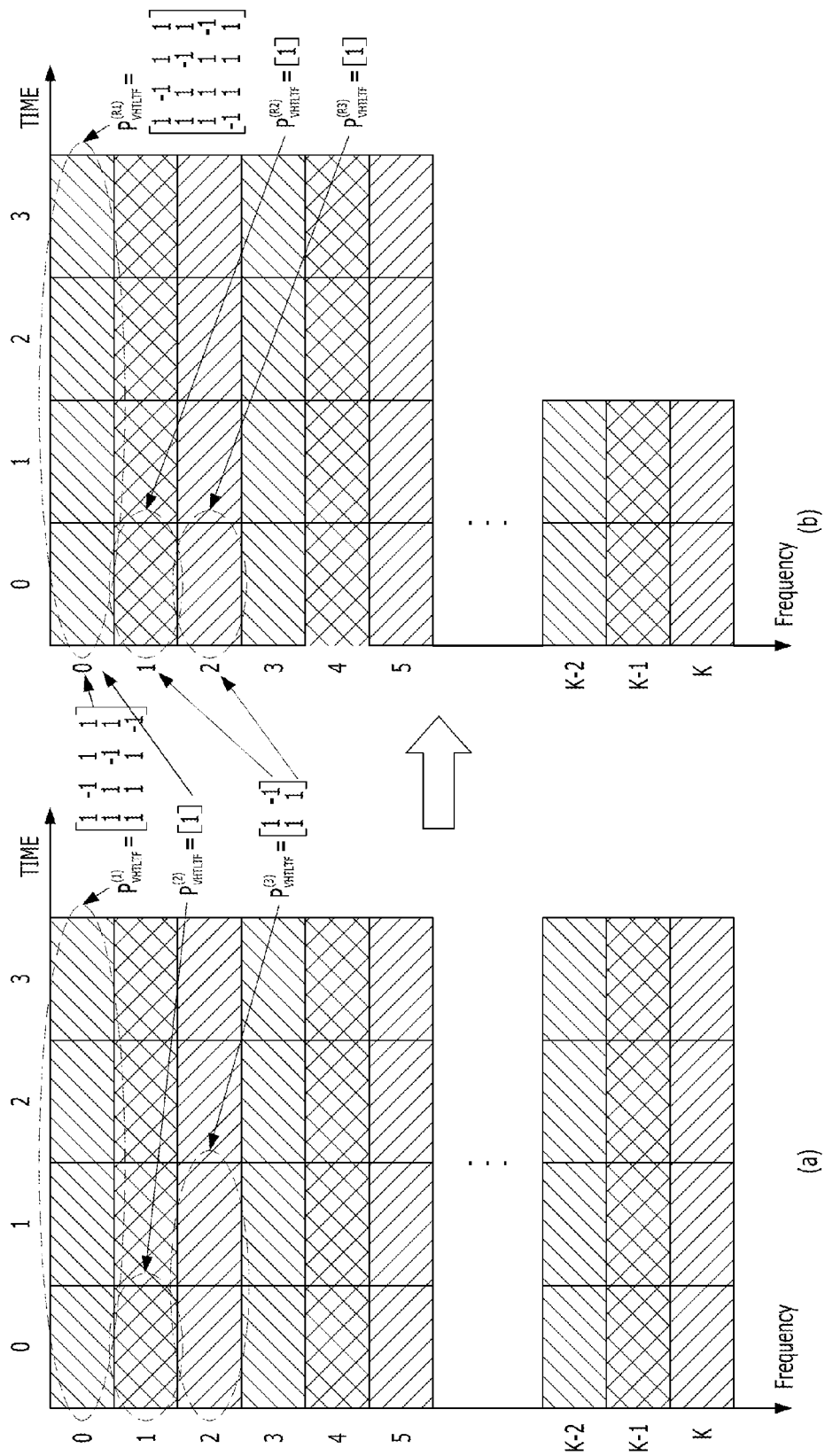
FIG. 9 is diagrams illustrating the long training field (LTF) allocation status using the recombination of streams depend

Referring to FIG. 9, since the number of streams to be transmitted by each station is {3, 1, 2} and the channel estimation performance of the station (STA) 3 needs to be improved, the number of streams is {3+1, 1, 1} by recombining the streams to be transmitted by each station. In this case, first factor {3+1} represents the transmission stream of the station (STA) 1 and the station (STA) 2 and second and third factors {1, 1} represents two transmission streams of the station (STA) 3. The number of LTFs required after the recombination is {4, 1, 1} and therefore, the number of LTFs required for transmission is 4.

When the above-mentioned allocation method is applied, each station may have the following performance. Since the station (STA) 1 has the excellent channel status, it may receive signals well. The station (STA) 2 has the excellent channel status and the LTF is coupled with the station (STA) 1, such that it has the same channel estimation performance as the station (STA) 1. The station (STA) 3 has the poor channel status and repeats the LTFs four times as compared with the station (STA) 1 and the station (STA) 2, such that the channel estimation performance may be improved.

In accordance with the second exemplary embodiment of the present invention, the cannel estimation performance may be improved by appropriately remapping the LTFs between the stations in consideration of received signal intensity, delay spread, or the like, all of which are the channel status information.

Under the above-mentioned conditions, comparison results of the method of allocating LTFs for each transmission stream of the station in accordance with the first exemplary embodiment of the present invention and the transmission stream recombination method depending on the channel status in accordance with the second exemplary embodiment of the present invention are as follows.

Referring to (a) in FIG. 9, when the stations to be transmitted are 3 and the number of streams to be transmitted by each station is {3, 1, 2}, the number of LTFs required for each station is {4, 1, 2}, such that the number of required LTFs is 4. An (a) in FIG. 9 illustrates the LTF allocation status in accordance with the first exemplary embodiment of the present invention. In the case of (a) in FIG. 9, the station (STA) 1 receives the received signals as represented by Equation 6. That is, the received signals in the subcarrier index that is a multiple of 3 are represented by Equation 6.

$$y_{3k}^{(1)} = H^{(1)}W^{(1)}\frac{p}{\sqrt{3}}P_{VHTLTF}^{(1)} + N_{3k}^{(1)}$$ [Equation 6]

In Equation 6, $W^{(1)}$ is a sub-matrix of weight matrix W, which is a 6×3 matrix of which the first column is three columns. Where $N_{3k}^{(1)}$ is a noise matrix of 3×4.

The channel estimation values are expressed by Equation 7.

$$\hat{H}_{3k}^{(1)} = \frac{4}{3}|p|^2 H^{(1)}W^{(1)} + \frac{p^*}{\sqrt{3}}N_{3k}^{(1)}(P_{VHTLTF}^{(1)})^H$$ [Equation 7]

The channel estimation values are allocated up to four symbols in the subcarrier index of the (a multiple of 3+1) by the above method and is thus repeated four times, such that it is expressed by Equation 8.

$$\hat{H}_{3k+1}^{(1)} = 4|p|^2 H^{(1)}W^{(2)} + \sqrt{4}N_{3k+1}^{(1)}(P_{VHTLTF}^{(2)})^H$$ [Equation 8]

Where ( ) is a sub-matrix of W, which is a 6×1 matrix of which the subsequent column of ( ) is one column. The noise portion is $n_{0_{3k+1}}^{(1)} + n_{1_{3k+1}}^{(1)} + n_{2_{3k+1}}^{(1)} + n_{3_{3k+1}}^{(1)}$ due to the repetition of four symbols, where a subscript below n represents the time index. The inter-symbol noise is independent and thus, becomes approximately $\sqrt{4}N_{3k+1}^{(1)}$. In the repeated format to be described below, the noise is marked in the above-mentioned approximate type. Where $N_{3+1}^{(1)}$ is a 1×1 noise matrix.

In the subcarrier index of (a multiple of 3+2), the channel estimation values are repeated two times since the channel estimation values are allocated up to four symbols in the subcarrier index, such that it is expressed by Equation 8. Where $W^{(3)}$ is a sub-matrix of W, which is a 6×2 matrix of which the final column is two columns. $N_{3k+2}^{(1)}$ is a 2×2 noise matrix.

$$\hat{H}_{3k+2}^{(1)} = 2|p|^2 H^{(1)}W^{(3)} + \sqrt{2}\frac{p^*}{\sqrt{2}}N_{3k+2}^{(1)}(P_{VHTLTF}^{(3)})^H$$ [Equation 9]

Therefore, the channel estimation values in the station (STA) 1 may be obtained by normalizing the channel estimation values of each subcarrier and then, combining the normalized channel estimation values depending on Equation 10.

$$\hat{H}^{(1)} = [\hat{H}_{3k}^{(1)} \hat{H}_{3k+1}^{(1)} \hat{H}_{3k+2}^{(1)}]$$ [Equation 10]

The station (STA) 2 and the station (STA) 3 may estimate the channels by the same method. The channel estimation values for each subcarrier corresponding to the station (STA) 3 are each expressed by Equation 11. In Equation 11, the) dimensions of the $N_{3k}^{(3)}$, $N_{3k+1}^{(3)}$, $N_{3k+2}^{(3)}$ matrices are each equal to that of $N_{3k}^{(1)}$, $N_{3k+1}^{(1)}$, $N_{3k+2}^{(1)}$.

$$\hat{H}_{3k}^{(3)} = \frac{4}{3}|p|^2 H^{(3)}W^{(1)} + \frac{p^*}{\sqrt{3}}N_{3k}^{(3)}(P_{VHTLTF}^{(1)})^H$$ [Equation 11]

$$\hat{H}_{3k+1}^{(3)} = 4|p|^2 H^{(3)}W^{(2)} + \sqrt{4}N_{3k+1}^{(3)}(P_{VHTLTF}^{(2)})^H$$

$$\hat{H}_{3k+2}^{(3)} = 2|p|^2 H^{(3)}W^{(3)} + \sqrt{2}\frac{p^*}{\sqrt{2}}N_{3k+2}^{(3)}(P_{VHTLTF}^{(3)})^H$$

Next, the channel estimation performance in accordance with the second exemplary embodiment of the present invention will be described. A (b) in FIG. 9 illustrates the LTF allocation status to which the stream recombination allocation method depending on the channel status in accordance with the second exemplary embodiment of the present invention is applied.

The station (STA) 1 can obtain the channel estimation values similar to the channel estimation method in accordance with the first exemplary embodiment of the present invention as described above. In the subcarrier index that is a multiple of 3, the channel estimation values are expressed by Equation 12. In Equation 12, $W^{(1)}$ is a sub-matrix of weight matrix W, which is a 6×4 matrix of which the first column is four columns. Where $N_{3k}^{(1)}$ is a 4×4 noise matrix.

$$\hat{H}_{3k}^{(1)} = |p|^2 H^{(1)}W^{(1)} + \frac{p^*}{\sqrt{4}}N_{3k}^{(1)}(P_{VHTLTF}^{(R1)})^H$$ [Equation 12]

The channel estimation values in the subcarrier index of (a multiple of 3+1) and the subcarrier index (a multiple of 3+2) are each expressed by Equation 13. In Equation 13, dimensions of a $N_{3k+1}^{(1)}$, $N_{3k+2}^{(1)}$ matrix each are 1×1.

$$\hat{H}_{3k+1}^{(1)} = 4|p|^2 H^{(1)}W^{(2)} + \sqrt{4}N_{3k+1}^{(1)}(P_{VHTLTF}^{(R2)})^H$$

$$\hat{H}_{3k+2}^{(1)} = 4|p|^2 H^{(1)}W^{(3)} + \sqrt{4}N_{3k+2}^{(1)}(P_{VHTLTF}^{(R3)})^H$$ [Equation 13]

Therefore, the channel estimation values in the station (STA) 1 may be obtained by normalizing the channel estimation values of each subcarrier and then, combining the normalized channel estimation values depending on Equation 14.

$$\hat{H}^{(1)} = [\hat{H}_{3k}^{(1)} \hat{H}_{3k+1}^{(1)} \hat{H}_{3k+2}^{(1)}]$$ [Equation 14]

When the channel estimation values of the station (STA) 3 are obtained by the above-mentioned method, they are expressed by Equation 15. In Equation 15, ( ) is a 2×6 channel matrix. In this case, the dimensions of the $N_{3k}^{(3)}$, $N_{3k+1}^{(3)}$, $N_{3k+2}^{(3)}$ matrices are each equal to that of $N_{3k}^{(1)}$, $N_{3k+1}^{(1)}$, $N_{3k+2}^{(1)}$.

$$\hat{H}_{3k}^{(3)} = |p|^2 H^{(3)}W^{(1)} + \frac{p^*}{\sqrt{4}}N_{3k}^{(3)}(P_{VHTLTF}^{(R1)})^H$$ [Equation 15]

$$\hat{H}_{3k+1}^{(3)} = 4|p|^2 H^{(3)}W^{(2)} + \sqrt{4}N_{3k+1}^{(3)}(P_{VHTLTF}^{(R2)})^H$$

$$\hat{H}_{3k+2}^{(3)} = 4|p|^2 H^{(3)}W^{(3)} + \sqrt{4}N_{3k+2}^{(3)}(P_{VHTLTF}^{(R3)})^H$$

Therefore, the channel estimation values in the station (STA) 3 may be obtained by normalizing the channel estimation values of each subcarrier and then, combining the normalized channel estimation values depending on Equation 16.

$$\hat{H} = [\hat{H}_{3k}^{(3)} \hat{H}_{3k+1}^{(3)} \hat{H}_{3k+2}^{(3)}]$$ [Equation 16]

The channel estimation corresponding to the station (STA) 3 is the final two column among six columns of the channel estimation matrix. If noise power of each element of the noise matrix is $\sigma^2$, a comparison result of the ratios of signal power to noise power of the final two columns is as follows.

Since the signal to noise ratio in accordance with the first exemplary embodiment of the present invention is $$\frac{2}{\sigma^2}$$

and the signal to noise ration in accordance with the second exemplary embodiment of the present invention $$\frac{4}{\sigma^2},$$

it can be appreciated that the channel estimation performance of the second exemplary embodiment of the present invention may be more improved than that of the first exemplary embodiment of the present invention.

Figure 10:
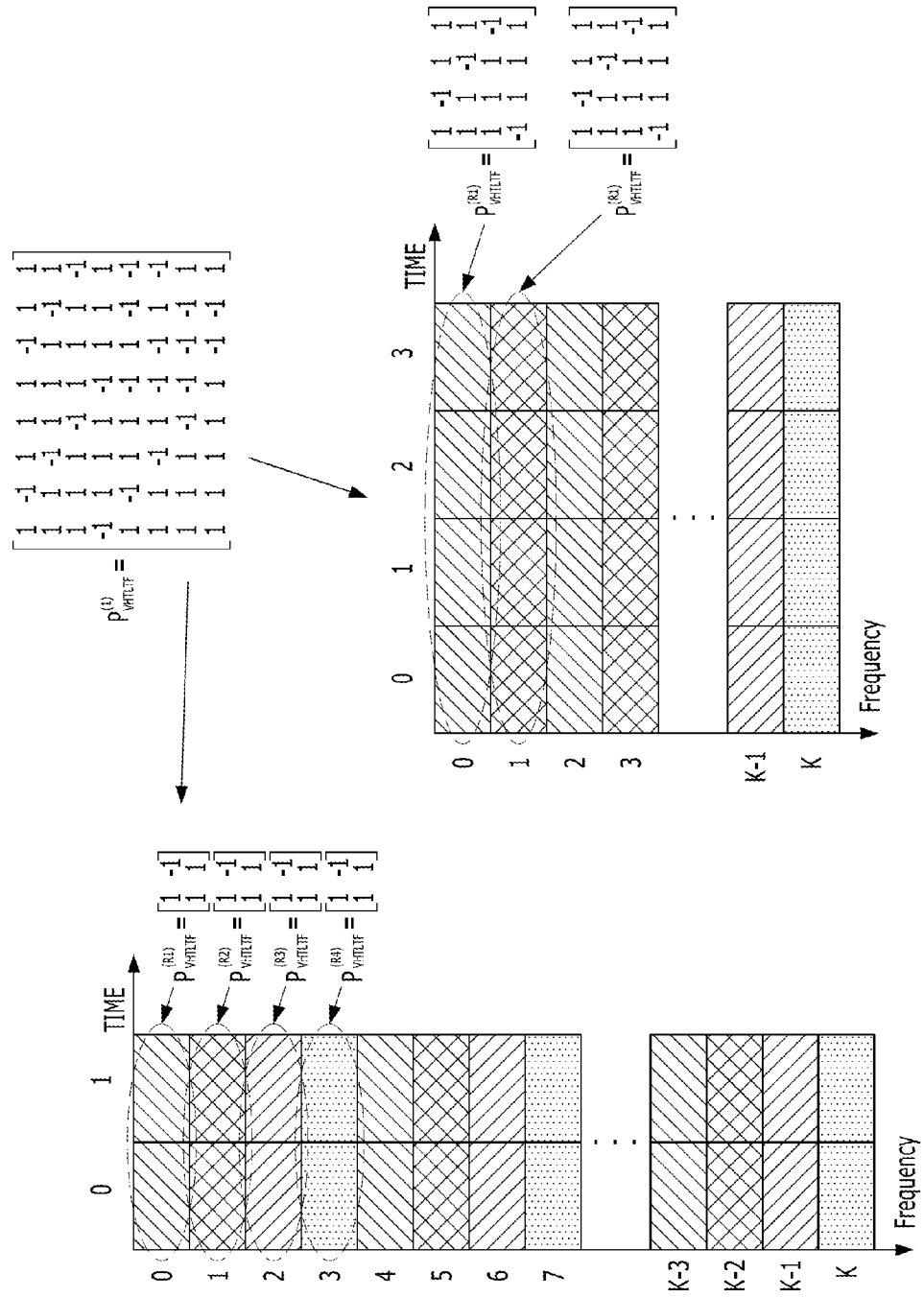
- FIG. 10 is a diagram illustrating the long training field (LTF) allocation status using the recombination of streams when the number of stations to be transmitted is 1 and the number of streams is 8, in accordance with an exemplary embodiment of the present invention.

FIG. 10 is a diagram for explaining the method of allocating LTFs when the number of station to be transmitted is 1 and the number of streams to be transmitted by the stations is 8.

Referring to FIG. 10, when the number of stations is 1 and the number of streams to be transmitted by the stations is 8, the number of required LTFs is 8. Eight transmission streams may be recombined into {2, 2, 2, 2} as illustrated in FIG. 10, in consideration of the data size to be transmitted, the channel status, or the like. The required number LTFs after the recombination is {2, 2, 2, 2} and thus, the number of required LTFs is 2. Therefore, the LTF overhead may be reduced. Alternatively, eight transmission streams may be recombined into {4, 4} and the number of required LTFs after the recombination is {4, 4}, such that the number of required LTFs is 4, thereby reducing the LTF overhead. The channel estimation performance may be improved by performing the recombination between the streams and then, repeating the LTF.

Figure 11:
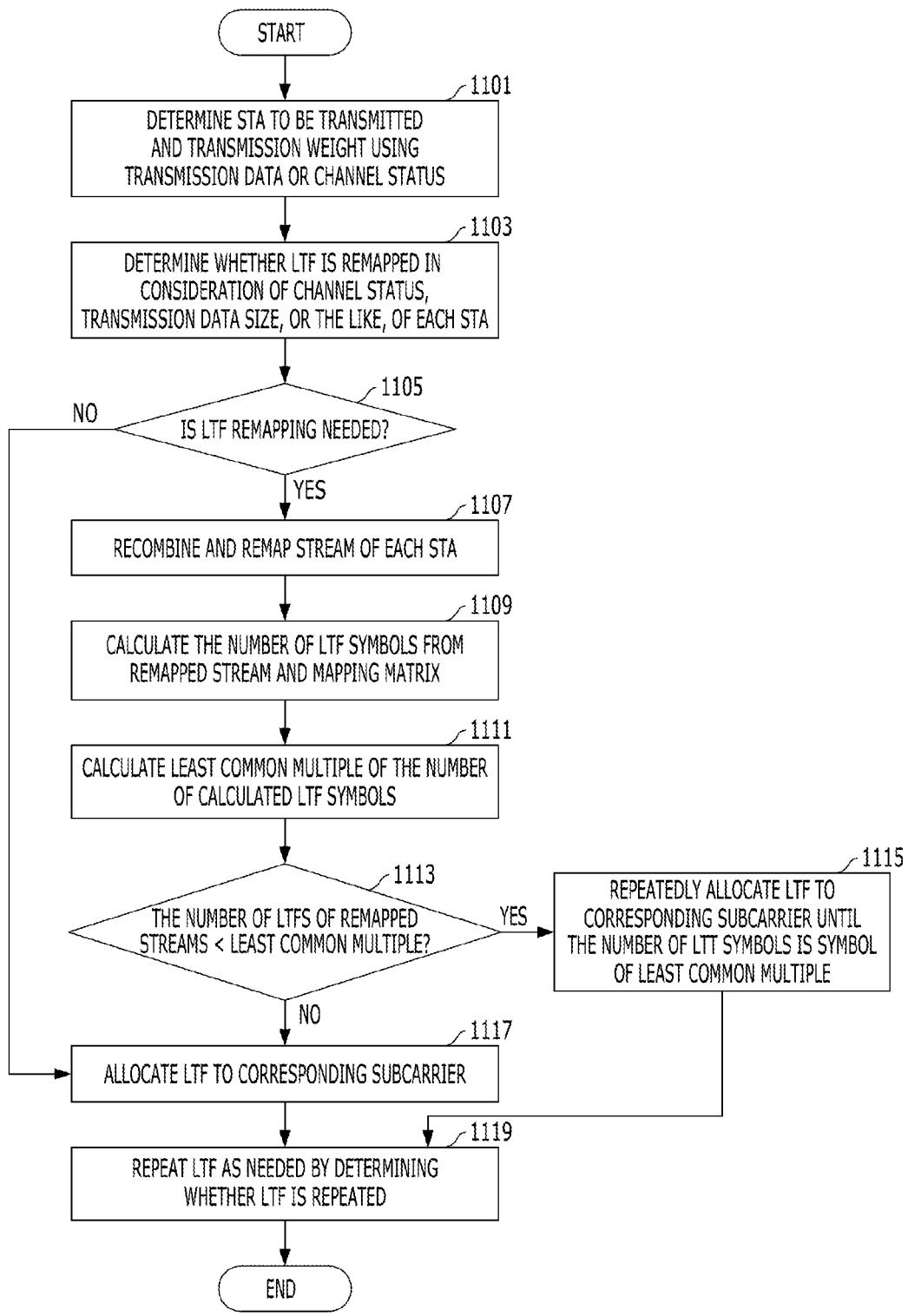
FIG. 11 is a flow chart for explaining a method of allocating long training field (LTF) using the recombination of streams in accordance with a second exemplary embodiment of the present invention.

FIG. 11 is a flow chart for explaining the method of allocating LTFs using the recombination for each transmission streams in accordance with the second exemplary embodiment of the present invention.

First, the number of stations to be transmitted is determined and the transmitting weight is determined, using the transmission data size, the quality of service (QoS), the channel status information, or the like (1101). Further, the number of transmission streams for each determined stations is determined.

Thereafter, it is determined whether the LTFs are remapped in consideration of the channel status, the transmission data size, or the like, of each station to be transmitted (1103). If it is determined that the remapping of the LTFs is not needed at the step 1103 (1105), the LTF symbols are allocated to the subcarriers allocated to each station to be transmitted (1117). In this case, the allocation of the LTF symbols to each station may be performed in accordance with the first exemplary embodiment of the present invention.

If it is determined that the remapping of the LTF at the step 1103 is required (1105), the transmission streams are remapped by combining the transmission streams of each station (1107). Further, the number of LTF symbols is calculated from the remapped streams and the LTF mapping matrix (1109) and the least common multiple of the LTF symbols required in the remapped stream is calculated (1111). Thereafter, it is confirmed whether the number of remapped LTF symbols is smaller than the least common multiple (1113). As a result, if smaller, the LTF symbols are repeated in the corresponding subcarrier until they are the symbol index of the least common multiple (1115). However, when the number of remapped LTF symbols is equal to the least common multiple, the LTF symbols are allocated to the corresponding subcarrier (1117). Thereafter, the LTF symbols are repeated as needed by determining whether the LTF symbols are repeated (1119).

The number of simultaneously transmitted stations, the number of streams to be transmitted by the stations, and the stream recombination information may be transmitted using the control information, or the like, during the process of connecting the VHT-SIG-C or the initial AP with the stations in FIG. 2.

Meanwhile, the channel estimation performance may be improved by allocating the weight to the LTF mapping code. The received signals transmitted while being allocated with the weight may be expressed by Equation 17.

$$y = HWG\frac{p}{\sqrt{N_{STS}}} P_{VHTLTF} + N \qquad \text{[Equation 17]}$$

In Equation 17, G is the weight of the LTF mapping code and is expressed by the following Equation 18.

$$G = \begin{bmatrix} g_{00} & 0 & \cdots & 0 \\ 0 & g_{11} & \cdots & 0 \\ \vdots & \vdots & \ddots & \vdots \\ 0 & 0 & \cdots & g_{N_{STS}N_{STS}} \end{bmatrix}, \qquad \text{[Equation 18]}$$

$$g_{00}^2 + g_{11}^2 + \ldots + g_{N_{STS}N_{STS}}^2 = N_{STS}$$

Therefore, the channel estimation values are expressed by the following Equation 19 and the station that does not have the excellent channel status may improve the channel estimation performance of the transmission streams. After the channel estimation, the channel estimation values are normalized with the weight of G, which is applied to the data demodulation.

$$\hat{H} = HWG|p|^2 + N\frac{p^*}{\sqrt{N_{STS}}} (P_{VHTLTF})^H \qquad \text{[Equation 19]}$$

The information of weight G for improving channel estimation may be transmitted using the control information, or the like, during the process of connecting the VHT-SIG-C or the initial AP to STAs.

The method of allocating a weight may be easily expanded and applied to the first exemplary embodiment of the present invention or the second exemplary embodiment of the present invention through the change in $P_{VHTLTF}$.

Further, the exemplary embodiment of the present invention may be similarly applied even though the mapping of the symbol region and the spatial stream is converted into the mapping of the subcarrier region and the spatial stream as expressed by the following Equation 20.

[Equation 20]

$$P_{VHTLTF} = \begin{bmatrix} c_{11} & c_{12} & \cdots & c_{1N_{LTF}} \\ c_{21} & c_{22} & \cdots & c_{1N_{LTF}} \\ \vdots & \vdots & \ddots & \vdots \\ c_{N_{STS}1} & c_{N_{STS}2} & \cdots & c_{N_{STS}N_{LTF}} \end{bmatrix} \begin{array}{l} \text{Symbol} \\ \\ \text{Spatial} \\ \text{Stream} \end{array}$$

$$P_{VHTLTF} = \begin{bmatrix} c_{11} & c_{12} & \cdots & c_{1N_{LTF}} \\ c_{21} & c_{22} & \cdots & c_{1N_{LTF}} \\ \vdots & \vdots & \ddots & \vdots \\ c_{N_{STS}1} & c_{N_{STS}2} & \cdots & c_{N_{STS}N_{LTF}} \end{bmatrix} \begin{array}{l} \text{Subcarrier} \\ \\ \text{Spatial} \\ \text{Stream} \end{array}$$

Figure 12:
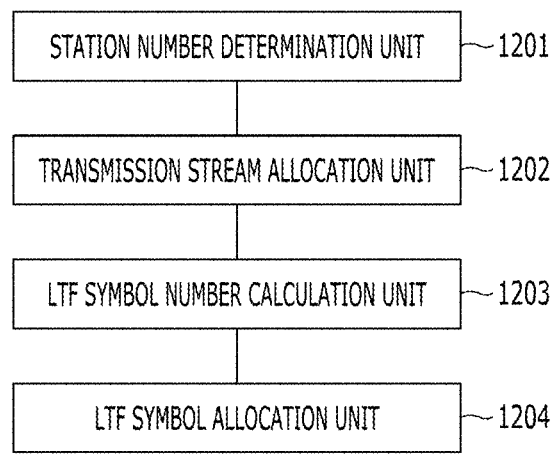
FIG. 12 is a block configuration diagram of an apparatus of transmitting a long training field in accordance with the exemplary embodiment of the present invention.

FIG. 12 is a block configuration diagram of the apparatus of transmitting a long training field in accordance with the exemplary embodiment of the present invention.

The apparatus of transmitting a long training field in accordance with the exemplary embodiment of the present invention is configured to include a station number determination unit 1201 that determines the number of stations to be transmitted, a transmission stream allocation unit 1202 that allocates the number of streams to be transmitted by each station, an LTF symbol number calculation unit 1203 that calculates the number of LTF symbols required for each station and determines the least common multiple of the number of LTF symbols for each station, and an LTF symbol allocation unit 1204 that allocates the LTF symbols to the subcarriers allocated to each station depending on the least common multiple of the calculated LTF symbols.

The station number determination unit 1201 determines at least one station (STA) to be transmitted using the transmission data size, the quality of service (QoS), the channel status information, or the like. In addition, the station number determination unit 1201 determines the transmission weight using the transmission data size, the quality of service (QoS), the channel status information, or the like.

The transmission stream allocation unit 1202 allocates the transmission streams (subcarriers) to at least one station (STA) to be transmitted, which is determined by the station number determination unit 1201. In this case, the transmission stream allocation unit 1202 determines whether the number of LTF symbols is remapped in consideration of the channel status, the transmission data size, or the like, of each station. Further, the transmission stream allocation unit 1202 remaps the number of LTF symbols by combining the transmission streams of each station when the remapping of the number of LTFs are needed.

The LTF symbol number calculation unit 1203 calculates the number of LTF symbols required for each station from the transmission streams allocated to each station by the transmission stream allocation unit 1202 and the mapping matrix and calculates the least common multiple of the number of calculated LTF symbols required for each station.

When the LTF symbol allocation unit 1204 receives the number of LTF symbols and the least common multiple required for each station from the LTF symbol number calculation unit 1203, the required LTF symbols are allocated to each station. In this case, the LTF symbol allocation unit 1204 repeatedly allocates the LTF symbols allocated to the previous time index until the number of LTF symbols of the stations is the symbol index of the least common multiple when the number of LTF symbols required for the stations is smaller than the least common multiple and allocates the LTF symbols corresponding to the least common multiple to the subcarriers allocated to the stations when the number of LTF symbols required for the stations is equal to the least common multiple of the number of LTF symbols. In addition, the LTF symbol allocation unit 1204 allocates the LTF symbols to the subcarriers allocated to the single station when the station to be transmitted is one. In addition, the LTF symbol allocation unit 1204 repeatedly allocates the LTF symbols as needed when the LTF symbols need to be repeated so as to improve the channel estimation performance.

In accordance with the exemplary embodiments of the present invention as described above, when at least one station (STA) transmits the plurality of data streams, it is possible to prevent the degradation in transmission efficiency due to the increase in the overhead of the LTF. Further, in accordance with the exemplary embodiments of the present invention, the channel estimation performance of the streams having the poor channel status may be improved. In addition, in accordance with the exemplary embodiments of the present invention, the transmission efficiency can be increased by controlling the length of LTFs by using the information regarding the channel status, the data size, or the like, of the simultaneous transmission stations (STAs), In addition, in accordance with the exemplary embodiments of the present invention, the channel estimation performance can be improved by allocating the transmission weight to the station (STA) having the poor channel status or the streams.

While the present invention has been described with respect to the specific embodiments, it will be apparent to those skilled in the art that various changes and modifications may be made without departing from the spirit and scope of the invention as defined in the following claims.

What is claimed is:

1. A method of allocating a long training field for transmitting in a multi-user multiple input multiple output based radio communication system, the method comprising:

determining, for a first and a second station each having one or more data transmissions streams, a first quantity of data transmission streams for the first station transmitted by a first subcarrier and a second quantity of data transmission streams for the second station transmitted by a second subcarrier;

calculating a first number of long training fields for the first station corresponding to the first quantity of data transmission streams and a second number of long training fields for the second station corresponding to the second quantity of data transmission streams;

calculating a least common multiple of long training fields for each of the first and second station;

comparing the least common multiple of the long training fields of the first and second station and selecting the largest least common multiple; and allocating in the first and second subcarrier a number of symbols corresponding to the largest least common multiple, wherein the long training fields for a first or second subcarrier are repeatedly allocated to the number of symbols corresponding to the largest least common multiple when the least common multiple of the first or second subcarrier is less than the largest least common multiple of long training fields, and wherein the long training fields for a subcarrier are allocated to the number of symbols corresponding to the largest least common multiple when the least common multiple of the subcarrier is the same as the largest least common multiple of long training fields.

2. The method of claim 1, further comprising
allocating additional long training fields for the first and second stations to improve channel estimation performance.

3. The method of claim 1, wherein the number of long training fields for each station is calculated using the quantity of data transmission streams for each station and a long training field mapping code.

4. The method of claim 3, wherein a weight is allocated to the long training field mapping code to improve channel estimation performance at the time of allocating the long training fields.

5. The method of claim 1, further comprising performing the determining, calculating, comparing and allocating steps for one or more additional stations together with the first and the second stations for a total number of stations.

6. The method of claim 5, wherein the total number of stations to be transmitted and a transmission weight for each station is determined using transmission data size, and channel status information.

7. A method of allocating a long training field in a multi-user multiple input multiple output based radio communication system, the method comprising:
determining a channel status for a plurality of stations each transmitted by a separate subcarrier and each having one or more data transmission streams;
determining for each of the plurality of stations a quantity of data transmissions streams and a number of long training fields corresponding to the quantity of data transmission streams;
combining and remapping transmission streams for each of the plurality of stations to reallocate long training fields to channels with comparatively better channel status;
calculating the number of long training fields corresponding to the number of remapped transmission streams and determining the least common multiple of the number of long training fields for each station with reallocated long training fields;
comparing the least common multiple of the long training fields of each station with reallocated long training fields and selecting the largest least common multiple; and
allocating in each subcarrier a number of symbols corresponding to the largest least common multiple of the reallocated long training fields
wherein the long training fields for a subcarrier are repeatedly allocated to the number of symbols corresponding to the largest least common multiple when the least common multiple of a subcarrier is less than the largest least common multiple of long training fields, and
wherein the long training fields for a subcarrier are allocated to the number of symbols corresponding to the largest least common multiple when the least common multiple of the subcarrier is the same as the largest least common multiple of long training fields.

8. The method of claim 7, further comprising allocating additional long training fields for each station to improve channel estimation performance.

9. The method of claim 7, wherein a total number of stations to be transmitted and a transmission weight for each station is determined using transmission data size, and channel status information.

10. The method of claim 7, wherein the number of long training fields for each station is calculated using the quantity of data transmission streams for each station and a long training field mapping code.

11. The method of claim 10, wherein a weight is allocated to the long training field mapping code to improve channel estimation performance at the time of allocating the long training fields.

12. An apparatus of transmitting a long training field in a multi-user multiple input multiple output based radio communication system, the apparatus comprising:
an access point configured to
determine at least one station to be transmitted using transmission data or channel status information;
determine a number of transmission streams for each of the least one station determined by a station number determination unit;
calculate a number of long training fields corresponding to the number of transmission streams for each of the at least one station determined by a transmission stream allocation unit;
calculate the least common multiple of the number of calculated long training fields for each of the at least one station;
compare each of the least common multiple of the number of calculated long training fields and selecting the largest least common multiple; and
allocate the long training fields for each station to each subcarrier allocated to each station to correspond to the largest least common multiple of the determined long training fields,
wherein the access point further
repeatedly allocates the number of symbols corresponding to the largest least common multiple when the least common multiple of a subcarrier is less than the largest least common multiple of long training fields, and
allocates to the number of symbols corresponding to the largest least common multiple when the least common multiple of the subcarrier is the same as the largest least common multiple of long training fields.

13. The apparatus of claim 12, wherein the access point further
determines a channel status for each station each transmitted by a separate subcarrier and each having one or more data transmission streams;
combines and remaps transmission streams for each station to reallocate long training fields to channels with comparatively better channel;
calculates the number of long training fields corresponding to the number of remapped transmission streams and determines the least common multiple of the number of long training fields for each station with reallocated long training fields;
compares the least common multiple of the long training fields of each station with reallocated long training fields and selects the largest least common multiple; and
allocates in each subcarrier a number of symbols corresponding to the largest least common multiple of the reallocated long training fields.

14. The apparatus of claim 12, wherein the access point allocates additional long training fields for each station to the subcarriers to improve channel estimation performance.

15. The apparatus of claim 12, wherein the access point further determines a total number of stations to be transmitted and a transmission weight for each station using transmission data size and channel status information.

16. The apparatus of claim 12, wherein the access point further calculates the number of long training fields for each station using the quantity of data transmission streams for each station and a long training field mapping code.

17. The apparatus of claim 12, wherein the access point further allocates a weight to the long training field mapping code to improve channel estimation performance.

* * * * *